Patented Dec. 30, 1941

2,268,168

UNITED STATES PATENT OFFICE 2,268,168

HEAT RESISTING MIRROR

Ronald Ernest Richardson, Oshawa, Ontario, Canada, assignor to Duplate Safety Glass Company of Canada Limited, Oshawa, Ontario, Canada No Drawing. Application November 21, 1939, Serial No. 305,566. In Canada October 30, 1939

10 Claims. (Cl. 91—69.1)

This invention relates to heat resisting mirrors and has been developed especially for reflectors for motion picture projectors.

Most motion picture reflectors used at present are made of a borosilicate glass with a low coefficient of expansion, such for example as that known under the trade name "Pyrex" having a silver reflecting surface and an inorganic back baked on the rear of the reflecting surface. Such mirrors have an average life in service of only about six to twelve months, their failure being apparently the result of chemical attack or oxidation of the silver either through minute pores in the back or through points where the relatively soft back has been scraped by the clamps used to hold the reflectors in the projectors.

In an attempt to overcome the disadvantages of mirrors having a silvered reflecting surface, mirrors whose reflecting surface is composed of aluminium evaporated on the glass have been tried, the back for such reflectors being generally inorganic and baked on the rear of the reflecting surface. Very few of these aluminium mirrors appear to have gone into commercial use but those which have been used have been found to fail at the end of anywhere from about one to two years' service, apparently because the back is not inert to aluminium.

The position at present is thus that, although the disadvantages of silvered reflectors are well known and although on the whole the life of a silver reflecting surface is not as long as the back, aluminium reflecting surfaces have up till now been very little used because they are more expensive and much more trouble to make, while the only available backs are not such as to give them a much greater life than the silver reflecting surfaces. If it were possible to fuse the present backs onto the mirrors the difficulty of the attack of the aluminium reflecting surface by the back might disappear, but this cannot be done since the materials of the back fuse at such a high temperature that to subject the mirror to it would destroy, or at least seriously damage, the reflecting surface. On the other hand, it has not been found possible to use as a back a substance or mixture of substances which will fuse at a temperature sufficiently low to avoid damage to the reflecting surface, since the resultant back has then a coefficient of expansion so much higher than that of the glass that it crazes the aluminium and thus completely spoils the reflecting surface.

According to the present invention the various difficulties above mentioned are overcome and a heat resisting mirror with a longer period of life than those heretofore known is made possible. The mirror of the invention is made of glass with a low coefficient of expansion, for example the borosilicate glass known under the trademark "Pyrex," provided with an aluminium reflecting surface and a backing which is substantially inert to aluminium and has an effective coefficient of expansion substantially equal to that of the glass. The backing is composed of particles of at least one material, e. g. fused quartz, with a lower coefficient of expansion than that of the glass, embedded in a fused matrix having a higher coefficient of expansion than that of the glass, the matrix being composed of vitrified material which fuses at a temperature low enough to avoid injury to the reflecting surface. The mirror is made by coating the back of an aluminium reflecting surface, formed on glass having a low coefficient of expansion, with a mixture of particles of a material having a higher coefficient of expansion than that of the glass but fusible at a temperature low enough to avoid injury to the reflecting surface and which when vitrified is substantially inert to aluminium, and of particles of a material, e. g. fused quartz, having a lower coefficient of expansion than that of the glass but infusible at or near the temperature of fusion of the first mentioned material and substantially inert to aluminium, the glass so coated being then subjected to a temperature sufficient to cause fusion of the first mentioned material.

It appears that in some way the particles of the material having the lower coefficient of expansion than that of the glass modify the coefficient of expansion of the matrix which is higher than that of the glass, so that the back as a whole has a coefficient substantially equal to that of the glass. A back composed of the matrix alone would be useless as it would craze the aluminium and a backing composed of the material having the lower coefficient of expansion would also be useless since, being infusible at any temperature low enough to avoid damage to the reflecting surface, it would not hold in place.

From what has preceded it can be seen that the invention is applicable to any heat resisting mirror, but as the principal development work on it has been done in connection with reflectors for motion picture projectors, it will be described in more detail in connection with this specific application.

A reflecting surface of aluminium is first applied to an appropriate glass blank in any suitable way. The rear of the reflecting surface is then coated with a mixture of very fine particles of the material with a coefficient of expansion higher than that of the glass and of the material of a coefficient of expansion lower than that of the glass, suspended in a suitable liquid vehicle such as water or alcohol or a mixture of both.

The first mentioned material may be any vitrifiable material which fuses at a temperature low enough to avoid injury to the reflecting surface. There is no particular minimum for the fusion point of this material and, speaking generally, the lower it is the better. It might be found that some material with a very low fusion point had such a high coefficient of expansion as to require the admixture of too large a proportion of quartz to permit the formation of a coherent back. A few tests would, however, show whether or not this was the case with any given material. In practice ceramic colours which fuse at a low enough temperature have been found perfectly satisfactory, the one generally used, although this was purely a matter of convenience, being a yellow colour manufactured by the Harshaw Chemical Company of Cleveland, Ohio, and sold under No. 7816. It is, of course, quite unimportant that the material should be coloured; it could very well be any finely ground sufficiently low fusing glass which, when fused, would be substantially inert to aluminium.

Fused quartz has ben found very satisfactory as the material having a lower coefficient of expansion than that of the glass. It is, however, possible that other materials might be used, such, for example, as the new very low expansion glass produced by the Corning Glass Company having a coefficient of expansion of about $8 \times 10^{-7}$ as compared with one of between 5.5 and $5.9 \times 10^{-7}$ for fused quartz. One or two tests would show the suitability of the material and the proportion in which it should appear in the mixture. When the glass is "Pyrex" and fused quartz is used, then the mixture may contain about 60% fused quartz and 40% of the material with the higher coefficient of expansion. It is by no means essential that these percentages be adhered to exactly and they will obviously change with the character of the glass to which the back is being applied. They are, however, indicated as having been found satisfactory in practice for glass of the type specified.

In practice the materials have been ground to a fineness such that they will pass a 200 mesh screen. The coarser the particles are ground, at least below 200 mesh, the less will be the effect of the quartz in reducing the coefficient of expansion of the matrix. A reduction of this effect may be unobjectionable and in those cases the grinding might be coarser, although there appears to be no advantage in making it so. There appears also to be no advantage in grinding it finer than 200 mesh.

When what may be termed the raw back has been applied, the mirror is baked at a temperature sufficient to cause fusion of the material having the higher coefficient of expansion than that of the glass. This temperature can quite safely be as high as about 550° C., at which the time of heat treatment is preferably about ten minutes. The temperature might be as high as 560° C., in which case a much shorter time should be used, but at this higher temperature there is a distinct danger of damaging the reflecting surface even with the shorter time. It is therefore best not to go substantially above 550° C. However, except for the possible difficulty discussed above of working with a vitrifiable material requiring too much quartz, there is no objection to going even well below 550° C.

Upon being removed from the furnace the mirror is cooled and is then ready for use. The back has a rough or pebbly surface as a result of the particles of unfused material in it but nevertheless has a distinct glaze by reason of the fusion of the matrix. It has a good resistance to abrasion and in this respect alone is a good deal more satisfactory than most backs now in use, since the mirror is held in the projector by clamps which tend to scrape the back. Mirrors prepared in accordance with the invention have been in use as reflectors for motion picture projectors for three years without any noticeable deterioration.

I claim:

1. A heat resisting mirror of glass with a low coefficient of expansion provided with an aluminium reflecting surface and a backing which is substantially inert to aluminium, has an effective coefficient of expansion substantially equal to that of the glass and is composed of particles of quartz of a size at least below 200 mesh with a lower coefficient of exapnsion than that of the glass embedded in a fused matrix having a higher coefficient of expansion than that of the glass, said matrix being composed of vitreous enamel which fuses at a temperature low enough to avoid injury to the reflecting surface.

2. A heat resisting mirror of glass with a low coefficient of expansion provided with an aluminium reflecting surface and a backing which is substantially inert to aluminium, has an effective coefficient of expansion substantially equal to that of the glass and is composed of particles of fused quartz of a size at least below 200 mesh embedded in a fused matrix having a higher coefficient of expansion than that of the glass, said matrix being composed of vitreous enamel which fuses at a temperature low enough to avoid injury to the reflecting surface.

3. A heat resisting mirror of glass with a low coefficient of expansion provided with an aluminium reflecting surface and a backing which is substantially inert to aluminium, has an effective coefficient of expansion substantially equal to that of the glass and is composed of particles of fused quartz of such a size as to pass through a 200 mesh screen embedded in a fused matrix having a higher coefficient of expansion than that of the glass, said matrix being composed of vitreous enamel which fuses at a temperature low enough to avoid injury to the reflecting surface.

4. A heat resisting mirror of a borosilicate glass with a low coefficient of expansion provided with an aluminium reflecting surface and a backing which is substantially inert to aluminium, has an effective coefficient of expansion substantially equal to that of the glass and is composed of particles of fused quartz of a size at least below 200 mesh embedded in a fused matrix having a higher coefficient of expansion than that of the glass, said matrix being composed of vitreous enamel which fuses at a temperature low enough to avoid injury to the reflecting surface and said fused quartz constituting approximately 60% of the back.

5. The method of making a heat resisting mirror, which comprises forming an aluminium reflecting surface on glass having a low coefficient of expansion, coating the reflecting surface with a mixture of particles of vitreous enamel having a higher coefficient of expansion than that of the glass but fusible at a temperature low enough to avoid injury to the reflecting surface and which when vitrified is substantially inert to aluminium and of particles of quartz of a size at least below 200 mesh having a lower coefficient of expansion than that of the glass but infusible at or near the temperature of fusion of the first mentioned material and substantially inert to aluminium, and subjecting the glass so coated to a temperature sufficient to cause fusion of the first mentioned material.

6. The method of making a heat resisting mirror, which comprises forming an aluminium reflecting surface on glass having a low coefficient of expansion, coating the reflecting surface with a mixture of particles of vitreous enamel having a higher coefficient of expansion than that of the glass but fusible at a temperature low enough to avoid injury to the reflecting surface and which when vitrified is substantially inert to aluminium and of particles of quartz of a size at least below 200 mesh having a lower coefficient of expansion than that of the glass but infusible at or near the temperature of fusion of the first mentioned material and substantially inert to aluminium, and subjecting the glass so coated to a temperature of not over about 550° C. at which temperature the enamel is fusible.

7. The method of making a heat resisting mirror, which comprises forming an aluminium reflecting surface on glass having a low coefficient of expansion, coating the reflecting surface with a mixture of particles of vitreous enamel having a higher coefficient of expansion than that of the glass but fusible at a temperature low enough to avoid injury to the reflecting surface and which when vitrified is substantially inert to aluminium and of particles of quartz of a size at least below 200 mesh having a lower coefficient of expansion than that of the glass but infusible at or near the temperature of fusion of the first mentioned material and substantially inert to aluminium, and subjecting the glass so coated to a temperature of not over about 550° C. for a period of not over ten minutes at which temperature the enamel is fusible.

8. The method of making a heat resisting mirror, which comprises forming an aluminium reflecting surface on glass having a low coefficient of expansion, coating the reflecting surface with a mixture of particles of vitreous enamel having a higher coefficient of expansion than that of the glass but fusible at a temperature low enough to avoid injury to the reflecting surface and which when vitrified is substantially inert to aluminium and of particles of fused quartz of a size at least below 200 mesh and subjecting the glass so coated to a temperature sufficient to cause fusion of the first mentioned material.

9. The method according to claim 8, in which the glass is a borosilicate glass and the particles of quartz constitute approximately 60% of the back.

10. The method according to claim 5, in which the particles of both materials in the mixture are of such a size as to pass through a 200 mesh screen.

RONALD ERNEST RICHARDSON.